UNITED STATES PATENT OFFICE 2,459,710

METHOD OF PREPARING GUANAMINES

Johnstone S. Mackay, Old Greenwich, and Joseph H. Paden, Stamford, Conn., assignors to American Cyanamid Company, New York, N. Y., a corporation of Maine No Drawing. Application July 9, 1946, Serial No. 682,284

7 Claims. (Cl. 260—249.5)

The present invention relates to the preparation of guanamines of the formula

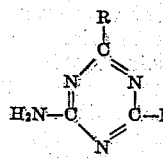

where R is hydrogen, or any aliphatic or aromatic hydrocarbon radical.

Heretofore, guanamines have been prepared by reacting biguanides with esters, acid chlorides or acid anhydrides, by reacting dicyandiamide with amidine salts or nitriles, and by the pyrolysis of guanidine salts of organic acids. In view of the expense of the biguanides, amidine salts, nitriles and guanidine salts it is readily apparent that the starting materials employed in all these methods for the preparation of guanamines are sufficiently expensive to render the production of the desired guanamines likewise expensive. On the other hand, a method has recently been devised for the production of guanides whereby dicyandiamide is reacted with an organic acid in the presence of molar quantities of concentrated strong mineral acid to prepare an acyl carbamyl guanidine which may be thereafter cyclized to a guanide by treatment with alkali. In some cases heat will also effect the cyclization. This method provides guanides at considerably less cost than has been possible heretofore. Such guanides are compounds of the following general formula

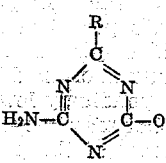

where R may be hydrogen, or any aromatic or aliphatic radical. Obviously, if such guanides could be converted to the corresponding guanamines by inexpensive means a cheap source of guanamines would be provided.

It has now been discovered that guanamines can be prepared by heating the aforementioned guanides in the presence of ammonia at temperatures within the range of substantially 250°–500° C. thus providing an inexpensive means of converting guanides to guanamines and accordingly making such guanamines available at low cost.

The equation for the conversion of the guanides to the guanamines may be written, empirically, as follows:

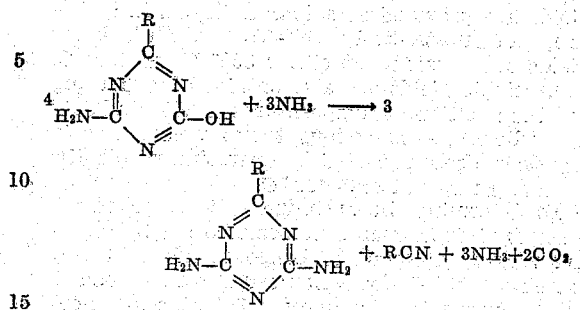

However, the formation of the guanamines from the guanides and ammonia probably takes place through a series of intermediate reactions rather than by direct conversion as shown above. It is probable that the ammonia reacts with the hydroxy group of the guanide, which reaction results in the formation of water and replacement of the hydroxy group with an —NH₂ group. The water thus produced undoubtedly tends to hydrolyze the guanamine, or unreacted guanide, or both, or possibly other intermediate products, with the ultimate formation of nitrile, carbon dioxide and ammonia as illustrated. Accordingly, while the above equation shows that the ammonia employed in the reaction may be completely recovered it is nevertheless necessary that the presence of ammonia be provided. In contrast to the ammoniation of the hydroxy triazine, ammeline, the guanides do not exhibit any marked tendency to decompose and provide ammonia so that it is, so far as may be determined, impossible to simply heat guanides in a closed vessel and obtain any guanamine. The presence of ammonia must be provided if any conversion of guanide to guanamine is to be obtained. Further, it has been found that ammonia exerts a stabilizing influence on guanamines and since it also tends to favor the reaction by virtue of mass action considerations a large excess of ammonia greatly in excess of that required by the above equation has been found to be beneficial.

While the reaction may be carried out over a wide range of temperatures, an additional point of difference between the ammoniation of cyanuric acid, ammelide, and ammeline to yield melamine and the ammoniation of guanides to yield guanamines resides in the deleterious effect of excessively high temperatures on the yields of guanamine provided. This is indicated by the data of Table I shown hereinafter. Said data were obtained by placing 50 g. of benzoguanide and 25 g. of anhydrous ammonia in an autoclave having an internal capacity of 300 cc. The autoclave was closed and heated to the indicated temperature for a period of 2 to 4 hours. The autoclave was then cooled in cold running water, opened, and the contents thereof analyzed.

*Table I*

| Temperature | Time | Guanamine Yield |
|---|---|---|
| °C. | Hours | Per cent |
| 300 | 2 | 31 |
| 325 | 2 | 46 |
| 350 | 2 | 48 |
| 350 | 2 | 51 |
| 350 | 4 | 53 |
| 375 | 2 | 51 |
| 400 | 2 | 33 |

From the above data it is apparent that optimum yields are provided at a temperature within the range of substantially 325°–375° C. while lower yields are obtained at either 300° C. or 400° C. Appreciable yields are also obtained by carrying out the reaction at temperatures of 250° and 500° C., although, as is obvious, they are considerably less than those provided by operating within the narrower range of 300°–400° C.

To determine the optimum ratio of reactants a series of experiments was carried out by reacting varying amounts of benzoguanide and ammonia at 350° C. for 2 hours using an autoclave having an internal capacity of 300 cc. and otherwise the same technique as above described. The averaged data obtained in this series of runs are shown in Table II below:

*Table II*

| Benzoguanide | NH$_3$ | Guanamine Yield |
|---|---|---|
| Grams | Grams | Per cent |
| 35 | 25 | 80 |
| 50 | 25 | 51 |
| 75 | 25 | 30 |

From the above data, it is readily apparent that the best results are obtained with the lower ratios of guanide to ammonia and that the ammonia pressure, which was identical in all runs, is not controlling. Of course, in actual operation a practical medium would be struck and capacity of production would not be sacrificed for the sole purpose of obtaining higher percentage yields. While there is no very close correlation between the amount of ammonia employed in the reaction, as expressed in terms of its partial pressure, and, as indicated hereinabove, reaction may be expected to occur so long as the presence of ammonia is provided, nevertheless, it is preferred that a minimum of about 200 lbs./sq. in. of ammonia pressure be provided. Maximum yields are obtained at ammonia pressures of substantially 2000 lbs./sq. in. and above. Although pressures considerably above 2000 lbs./sq. in. may be employed if desired, such additionally high ammonia pressures serve to provide no additional advantage and only necessitate the use of stronger reaction vessels.

Other guanides which have been ammoniated to the corresponding guanamines are aceto-, capro-, laura-, sebaco-, and propionoguanide and in all cases the above discussed conditions of temperature, ratio of reactants and other conditions of reaction have been found to hold. In each of these cases the corresponding guanamine resulted except that with sebacoguanide pelargonoguanamine was also produced. In the case of such dibasic guanides both the di- and monobasic product can be expected. Sebacoguanide is a compound of the following formula

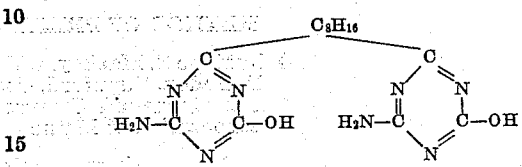

so that it is readily apparent that the pelargonoguanamine results from splitting off one of the triazine rings from the bridging aliphatic chain. Other dibasic guanides will provide both the di- and monobasic guanamines.

Isolation of the guanamines may be effected by any suitable method but generally it will be found advantageous to effect the separation on the basis of their solubility in sulfuric acid, or, perhaps more correctly, the solubility of their sulfates, and the insolubility of the guanides and by-product melamine in such acid solutions. Hydrochloric acid may likewise be used as may also dilute nitric acid, although the latter is less desirable because of its difficult handling characteristics. Other acids capable of forming soluble salts with the guanamines may also be used. After dissolving out the guanamine and separating the insoluble material, as by filtration, the guanamine may be recovered by precipitation with alkali hydroxide or other suitable base which will serve to neutralize the acid solution in which the guanamine is dissolved. Another convenient method of separating the guanamines relies upon their general solubility in dioxane, the guanides and melamine being insoluble. The procedure is the same as that employed when the guanamines are separated with acid except that the guanamines are recovered from solution by removal of the solvent, as by distillation or evaporation, and the guanamines are allowed to crystallize or otherwise precipitate.

While there is some indication of increased yields being provided by heating for more than 2 hours, say, for 4 or 6 hours, only a small increase in yield is obtained by so doing and the practice of using such longer periods of reaction is not practical from the standpoint of production. Undoubtedly, a period of reaction of less than 2 hours may be employed but if such period of reaction is unduly shortened the yields provided will be correspondingly lower.

Other guanides that may be reacted in accordance with the process of the present invention include those wherein the R of the above-given formula is ethyl, propyl, butyl, isobutyl, hexyl, heptyl, nonyl, dodecyl, lauryl, allyl, vinyl, cyclohexyl, benzyl, tolyl, xylyl, naphthyl, and various other aromatic radicals in which one or more hydrogens of the ring are replaced by such aliphatic radicals as ethyl, propyl, butyl, vinyl, allyl, amyl, hexyl, heptyl, octyl, nonyl, decyl, undecyl, dodecyl, cyclohexyl, and the like.

While the invention has been described with particular reference to specific embodiments, it is to be understood that it is not to be limited thereto but is to be construed broadly and restricted solely by the scope of the appended claims.

What is claimed is:

1. A method of preparing a guanamine which comprises heating a guanide of the formula

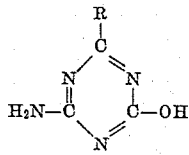

where R is a member of the group consisting of hydrogen, an aliphatic hydrocarbon radical and an aromatic hydrocarbon radical, in the presence of added ammonia under pressure at a temperature within the range of substantially 250°–500° C., and recovering the thus-formed guanamine.

2. A method of preparing a guanamine which comprises heating a guanide of the formula

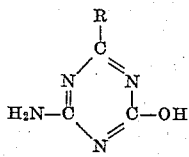

where R is a member of the group consisting of hydrogen, an aliphatic hydrocarbon radical and an aromatic hydrocarbon radical, in the presence of added ammonia under pressure at a temperature within the range of substantially 300°–400° C., and recovering the thus-formed guanamine.

3. A method of preparing a guanamine which comprises heating a guanide of the formula

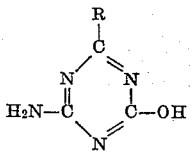

where R is a member of the group consisting of hydrogen, an aliphatic hydrocarbon radical and an aromatic hydrocarbon radical with ammonia, under an ammonia pressure of at least 200 lbs./sq. in. at a temperature within the range of substantially 250°–500° C., and recovering the thus-formed guanamine.

4. A method of preparing a guanamine which comprises heating a guanide of the formula

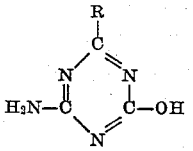

where R is a member of the group consisting of hydrogen, an aliphatic hydrocarbon radical and an aromatic hydrocarbon radical with ammonia, under an ammonia pressure of at least 200 lbs./sq. in. at a temperature within the range of substantially 300°–400° C. and recovering the thus-formed guanamine.

5. A method of preparing an aliphatic guanamine which comprises heating a guanide of the following formula

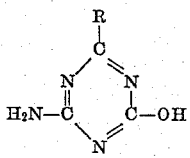

where R is an aliphatic hydrocarbon radical with ammonia under an ammonia pressure of at least 200 lbs./sq. in. at a temperature within the range of substantially 300°–400° C. and recovering the thus-formed guanamine.

6. A process of preparing an aromatic guanamine which comprises heating a guanide of the following formula

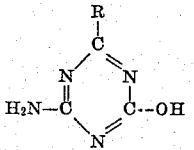

where R is an aromatic hydrocarbon radical with ammonia under an ammonia pressure of at least 200 lbs./sq. in. at a temperature within the range of substantially 300°–400° C. and recovering the thus-formed guanamine.

7. A method of preparing a guanamine which comprises heating a guanide of the following formula

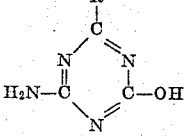

where R is a member of the group consisting of hydrogen, an aliphatic hydrocarbon radical and an aromatic hydrocarbon radical with ammonia, under an ammonia pressure of at least 2000 lbs./sq. in. at a temperature within the range of substantially 325°–375° C. and recovering the thus-formed guanamine.

JOHNSTONE S. MACKAY.
JOSEPH H. PADEN.

No references cited.